Nov. 24, 1970   H. W. SOLLER   3,543,000
APPARATUS FOR REMOVING A SUPPORT FOR A FUSIBLE PATTERN
ASSEMBLY AND METHOD OF REMOVAL
Filed June 12, 1968
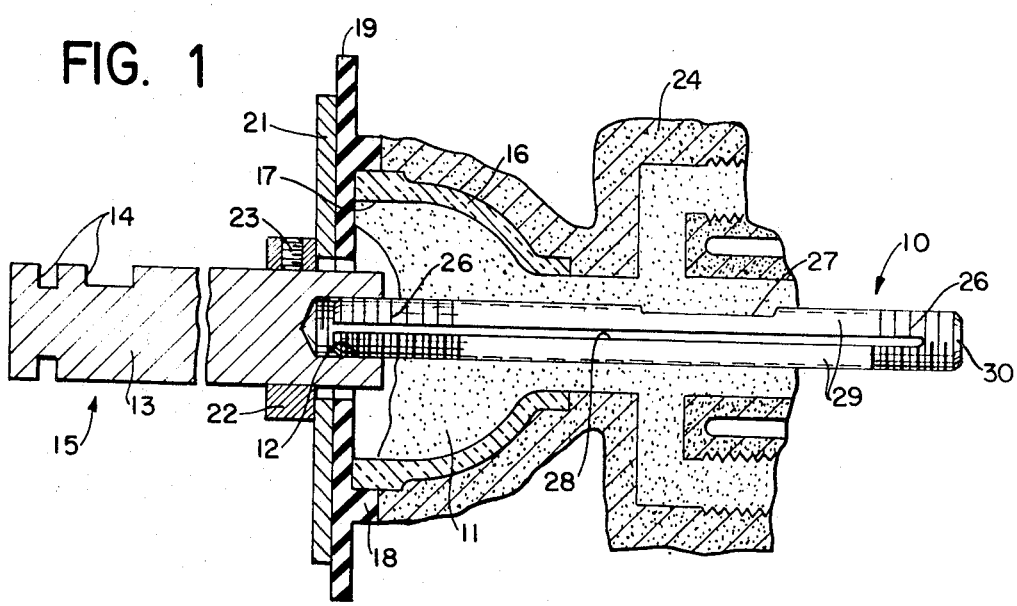
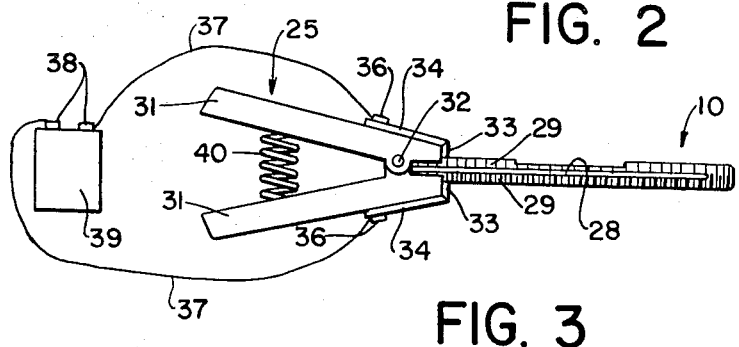
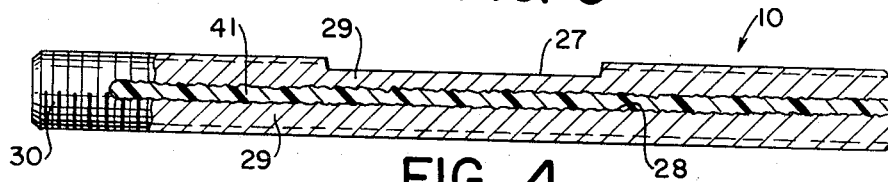
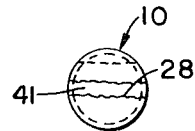
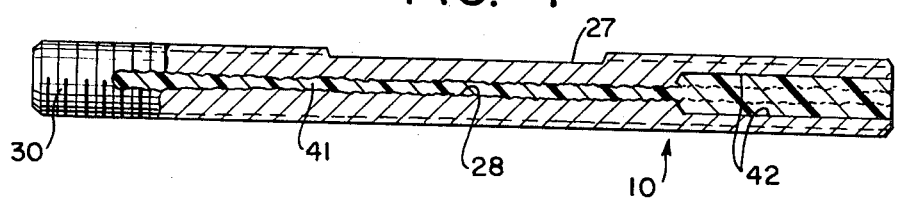
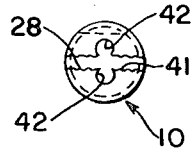
INVENTOR
HENRY W. SOLLER
BY
Pennie, Edmonds, Morton, Taylor & Adams
ATTORNEYS

United States Patent Office 3,543,000
Patented Nov. 24, 1970

3,543,000
APPARATUS FOR REMOVING A SUPPORT FOR A FUSIBLE PATTERN ASSEMBLY AND METHOD OF REMOVAL
Henry W. Soller, Dover, N.J., assignor to Howmet Corporation
Filed June 12, 1968, Ser. No. 736,439
Int. Cl. C21d 1/40; H05b 1/00
U.S. Cl. 219—162
2 Claims

ABSTRACT OF THE DISCLOSURE

This disclosure relates to an apparatus for removing a support embedded in a fusible pattern assembly which support is constructed to facilitate its removal from the pattern and also relates to the method of removal. The apparatus includes means for electrically heating the assembly support which support is an elongated metallic element having an electrically conductive path passing substantially throughout the element to rapidly heat a substantial portion of the element causing the fusible pattern material to soften and release the support.

BACKGROUND OF THE INVENTION

In the production of investment castings a cluster of patterns made of wax or other fusible material are often assembled around a central wax sprue which is connected to an enlarged pouring end forming a crucible or pouring basin for the mold. Such a wax pattern assembly requires a support extending from it to facilitate its handling and permit its attachment to the arm of the transport machine used for its handling to form the refractory shell mold on the assembly. Pattern assemblies and large patterns are heavy and require secure supports to permit freedom of handling without the support loosening or being pulled out. The firmness of the support in the fusible material has made rapid removal of the support a significant problem.

Pattern and assembly supports have included a bolt, pin or other elongated metallic element which is embedded in the fusible material with one end portion extending therefrom to permit it to be gripped by hand or by use of a tool or other device.

The techniques for removal of such supports have included the use of a gas flame to heat the exposed end of the support causing the embedded portion of the support to be slowly heated by conduction. This technique is slow and not satisfactory for handling of large numbers of assemblies.

Assembly supports have also been removed by use of high-frequency induction heating units, but this technique has the disadvantage of requiring costly induction heating equipment including an induction coil large enough to surround the largest assembly to be used. The use of a large coil results in inefficient and slow heating of the supports since they are a substantial distance from the coil. If a large number of coils are used to accommodate the various sizes of assemblies, the cost of the equipment is further increased. The present invention overcomes the disadvantages of these prior techniques.

SUMMARY OF THE INVENTION

Broadly, the invention comprises an apparatus and method for rapid removal of a fusible pattern assembly support including a support element having a plurality of spaced-apart substantially parallel elements, connecting means for electrically connecting together the ends of the elements within the pattern and voltage means for readily applying an electrical potential between the protruding ends of at least two of the elements to cause electric currents to flow through the elements and the connecting means to heat at substantially the same time portions of support within and without the pattern assembly.

It is a feature of the invention that the voltage means necessary to cause sufficient current to flow in the support may be an inexpensive portable transformer unit for stepping down available line voltage to a low voltage, for example, 1 to 10 volts.

It is also a feature of the invention that the spaces between the conductive elements will receive fusible material from the pattern or may have insulation placed in them, these materials serving to prevent voltage discharge from one element to another.

BRIEF DESCRIPTION OF THE DRAWINGS

In the drawings, FIG. 1 is an enlarged sectional view of a wax pattern assembly having an assembly support rod therein, and FIG. 2 is a portable device for electrically heating and extracting the wax-engaging rod.

FIGS. 3 and 4 are enlarged elevational sectional views of alternative rod constructions, and FIGS. 3a and 4a are end elevational views of the rods of FIGS. 3 and 4.

DETAILED DESCRIPTION OF THE PREFERRED EMBODIMENT

Referring to FIG. 1, threaded support rod 10 is embedded in the central portion of wax pattern assembly 11 with one end portion of the rod protruding sufficiently for threaded engagement with a threaded recess 12 of support extension 13. Extension 13 has a suitable length and notches 14 for disengageable attachment with a chuck on the end of an arm of a transport unit (not shown) to provide transport of the wax pattern assembly to the various treatment stations used in the manufacture of refractory mold 24. The extension 13 also serves as a tool or handle for manual handling of the assembly and the surrounding refractory mold.

Ceramic cup-shaped crucible 16 has an inlet opening 17 adapted to fit within the raised circular lip 18 of rubber gasket 19. Gasket 19 may be made of any resilient material suitable for sealing the inlet opening 17 to prevent the entrance of refractory materials, coatings and other substances used in the manufacturing of the refractory mold. Gasket 19 is urged against crucible 16 by steel disc 21 which in turn is urged toward the wax assembly by collar 22. Rod 10 and extension 13 are placed under tension by urging the collar 22 against the disc 21 and are then held under tension by tightening of set screw 23.

The pattern assembly is handled and transported by gripping the assembly support 15 which includes the rod 10 and extension 13 and a refractory mold 24 is formed on the wax assembly using prior methods of mold manufacture.

Rod 10 is an elongated metallic member with a circular cross-section having threads 26 over its entire length and having a flat exterior portion 27 over a portion of its length. The threads of the rod serve to increase the strength of the bond between the rod and the wax permitting greater forces of acceleration to be used in transporting the pattern. Threads or similar irregularities in the surface of the rod may be formed over less than the entire surface of the pin while still increasing the strength of the rod and wax engagement. Flat portion 27 serves to resist turning of the rod in the wax.

Rod 10 has a slot 28 cut from the extension-engaging end of the rod and extending substantally the entire length of the rod. The slot 28 also extends from one side to the other to form two substantially equal length leg elements 29 having substantially semi-circular cross-sections. The width of the slot is sufficient to prevent voltage discharge or electrical current flow from one leg to the other leg when a relatively small voltage differential, for example, 1 to 10 volts, is applied across the extension-engaging ends of the legs. When a voltage is applied across the protruding ends of the legs 29, electrical current is caused to flow down one leg through the embedded end of the rod 30 and back the other leg to heat substantially the entire rod. The legs 29 and rod end portion 30 provide an electrically conductive path or circuit within the support.

Turning to FIG. 2, a plier-like device 25 includes a pair of wooden handles 31 pivotably connected about axis pin 32 and has electrically conductive jaw sections 33 connected to metal strips 34. Terminals 36 connect lead wires 37 to transformer terminals 38 of transformer 39. Device 25 may be positioned and operated by hand or by any suitable mechanism. Spring 40 urges the longer portion of handles 31 apart to cause jaw sections 33 to engage in metal-to-metal contact with those ends of legs 29 extended to the position outside the wax assembly. An inexpensive 60-cycle alternating current transformer having a voltage output of about 2.5 volts and a maximum of 900 amperes has been found suitable for use with support rods suitable for large patterns or assemblies. The amperes provide for resistance-heating of substantially the entire rod as the current flows along the legs 29. Heat generated is rapidly transferred throughout the rod by conduction. The rod may be slotted or fabricated to form the leg sections and more than two leg sections may be used.

In FIG. 3, an alternative rod construction includes a rough cut slot 28 filled with plastic insulation 41. The rough cut surface of slot 28 serves to hold insulation 41 in the slot. FIG. 4 illustrates another rod construction having two holes 42 drilled at end of the rod adapted to protrude from the assembly. The holes are adapted to receive insulation material and to hold it firmly to prevent arcing and voltage discharge between the rod legs which are urged toward one another by the action of jaws 33. Holes 42, which may be of any shape or number, provide a means for placing additional insulation at the portion of the legs most readily deflected toward one another.

A preferred insulation for insertion in the slot and holes of the rod is layers of epoxy-coated glass tape. After insertion of the tape in the rod and hardening of the epoxy, excess material protruding from the rod may be removed by a cutting tool such as a thread-cutting die. Insulation 41 is sufficiently non-compressible to reduce movement of the leg ends toward one another thus avoiding arcing. Other suitable insulation materials may be used and known methods of securing the insulation within the slot of the metallic rod may be used. Insulation may be placed in all or part of the rod slot and where voltage discharge is not a problem due to reduced voltage or resistance of the legs to deflection or other factors, no insulation may be required.

After transporting and handling of the assembly and superimposed refractory mold has been completed, the method of removing the rod from the wax pattern assembly includes releasing the set screw 23 and removing the disc 21 and dip seal gasket 19 to expose the protruding end of the rod. The plier arrangement 31 is then operated to cause the jaws to grip the end portions of the rod legs and electric current is caused to flow through the legs and embedded end section of the rod causing the wax immediate to the surface of the rod to melt within a very short period of time, for example, 10 to 50 seconds, permitting the pin to be pulled out of the wax by application of a small force, for example, a few pounds, on the plier arrangement or alternatively the pin may be allowed to drop out of the wax pattern under the force of gravity where the pattern assembly is properly oriented.

I claim:
1. A method of removing a support member from a fusible pattern assembly wherein the element has a portion surrounded by the fusible material of the assembly and a portion extending from the assembly comprising:
   (a) providing in the element a plurality of spaced-apart substantially parallel legs by forming a longitudinal slot in the element of sufficient length such that when the element is placed in the pattern the slot will extend into the pattern,
   (b) engaging the end portions of the legs protruding from the assembly with engageable gripping means which include means for applying voltage to the legs to cause an electric current to flow through the legs,
   (c) melting the fusible material adjacent the element, and
   (d) thereafter moving the gripping means away from the assembly to withdraw the element from the assembly.
2. An apparatus for extracting a supporting device which supports a fusible pattern assembly during its transport and treatment comprising:
   (a) an elongated member having a substantial portion of its length positioned in the pattern assembly and having a portion of its length protruding from the pattern assembly;
   (b) an electrical and heat conductive path formed in the member for heating the member to facilitate its removal from the fusible material of the assembly, the path in turn comprising:
      (i) at least tow spaced-apart and substantially parallel conductive elements; and
      (ii) the end portion of the metallic member adapted to be positioned within the assembly for joining the conductive elements; and
   (c) portable means for heating and withdrawing the elongated member from the fusible material such means in turn comprising:
      (i) engageable means capable of being releasably engaged and disengaged from the protruding end of the elongated member;
      (ii) gripping means for positioning and urging the engageable means against the member with sufficient force to enable the member to be withdrawn when the gripping means is moved away from the assembly;
      (iii) voltage generating means attached to the gripping means for applying through the gripping means a voltage to at least two of the conductive elements to cause an electric current to flow through the conductive path; and
   (d) a substantially incompressible insulation material positioned between those portions of the conductive elements which are engaged by said gripping means to prevent arcing across said portions when the gripping means is applied.

References Cited
UNITED STATES PATENTS

| | | | |
|---|---|---|---|
| 868,495 | 10/1907 | Shipley | 62—351 |
| 3,433,030 | 3/1969 | Jacobs | 62—351 |

JOSEPH V. TRUHE, Primary Examiner

L. A. ROUSE, Assistant Examiner